United States Patent
Lagakos et al.

(10) Patent No.: US 11,150,114 B1
(45) Date of Patent: Oct. 19, 2021

(54) FIBER OPTIC ELECTROMAGNETIC PHENOMENA SENSOR SYSTEM

(71) Applicant: Fiber Optic Sensor Systems Technology Corporation, Washington, DC (US)

(72) Inventors: Nicholas Lagakos, Silver Spring, MD (US); Victor Kaybulkin, Chantilly, VA (US); Patrick Hernandez, Silver Spring, MD (US); Christopher Vizas, Washington, DC (US)

(73) Assignee: SMARTSENSECOM, INC., Washington, DC (US)

(*) Notice: Subject to any disclaimer, the term of this patent is extended or adjusted under 35 U.S.C. 154(b) by 1041 days.

(21) Appl. No.: 14/283,074

(22) Filed: May 20, 2014

(51) Int. Cl.
  *G01D 5/26* (2006.01)
  *G02B 6/04* (2006.01)
  *G02B 6/42* (2006.01)

(52) U.S. Cl.
  CPC .............. *G01D 5/268* (2013.01); *G02B 6/04* (2013.01); *G02B 6/4298* (2013.01)

(58) Field of Classification Search
  CPC ............. G02B 6/04; G02B 6/00; G01D 5/268
  USPC .......................................................... 385/12
  See application file for complete search history.

(56) References Cited

U.S. PATENT DOCUMENTS

| | | | |
|---|---|---|---|
| 5,010,770 A * | 4/1991 | Berthold | G01D 5/268 250/227.14 |
| 5,400,142 A | 3/1995 | Lavin | |
| 5,631,559 A | 5/1997 | Oliver | |
| 6,575,965 B1 * | 6/2003 | Fitch | A61B 17/12022 606/15 |
| 6,621,258 B2 | 9/2003 | Davidson | |
| 6,882,429 B1 * | 4/2005 | Weitekamp | G01K 11/3213 356/482 |
| 7,020,354 B2 | 3/2006 | Lagakos | |
| 7,149,374 B2 | 12/2006 | Lagakos | |
| 7,327,512 B2 | 2/2008 | Watanabe | |
| 7,379,630 B2 | 5/2008 | Lagakos | |
| 7,460,740 B2 | 12/2008 | Lagakos | |
| 7,567,740 B2 * | 7/2009 | Bayindir | B29D 11/00663 385/100 |
| 7,646,946 B2 | 1/2010 | Lagakos | |
| 7,697,798 B2 | 4/2010 | Lagakos | |
| 7,714,735 B2 | 5/2010 | Rockwell | |

(Continued)

*Primary Examiner* — Kaveh C Kianni
(74) *Attorney, Agent, or Firm* — Hogan Lovells US LLP (57) ABSTRACT

A multiplexed fiber optic sensor system including at least one light source, one or more first optical fibers having a first end arranged to receive light from the light source(s) and transmit the light to at least one fiber optic sensor, and one or more second optical fibers arranged to receive reflected light from the fiber optic sensors and transmit the reflected light to a light sensing element. Using the sensor system, it is possible to measure physical phenomena, such as electromagnetic phenomena, along multiple points along or within a material or structure of interest or on separate materials or structures. The fiber optic sensors can be electromagnetic phenomena sensors, pressure sensors, acceleration sensors, strain sensors, temperature sensors, or other sensors designed to measure physical phenomena. The sensor system can be used to measure phenomena of interest at several locations or take different kinds of measurements at the same or approximately the same location.

35 Claims, 8 Drawing Sheets

(56) References Cited

U.S. PATENT DOCUMENTS

| | | | | |
|---|---|---|---|---|
| 7,786,719 | B2* | 8/2010 | Kurosawa | G01R 15/247 324/96 |
| 8,168,120 | B1* | 5/2012 | Younis | G01N 29/022 422/68.1 |
| 8,195,013 | B2 | 6/2012 | Lagakos | |
| 9,104,271 | B1* | 8/2015 | Adams | G06F 3/0426 |
| 2002/0101130 | A1* | 8/2002 | Ribak | G02B 26/0825 310/311 |
| 2005/0254061 | A1* | 11/2005 | Alphonse | A61B 5/0066 356/479 |
| 2006/0072888 | A1* | 4/2006 | Lagakos | G01L 9/0077 385/117 |
| 2008/0087047 | A1* | 4/2008 | Bayindir | B29D 11/00663 65/389 |
| 2009/0058422 | A1* | 3/2009 | Tenghamn | G01V 3/083 324/337 |
| 2009/0196543 | A1* | 8/2009 | Lagakos | G01D 5/268 385/12 |
| 2009/0252451 | A1* | 10/2009 | Lagakos | G01D 5/268 385/13 |
| 2012/0162661 | A1* | 6/2012 | Dagalakis | G01B 9/02012 356/482 |
| 2012/0293806 | A1* | 11/2012 | Cranch | G01D 5/35383 356/477 |
| 2016/0146607 | A1* | 5/2016 | Celikel | G01C 19/725 356/465 |
| 2018/0034912 | A1* | 2/2018 | Binder | H04L 67/12 |

\* cited by examiner

FIBER OPTIC ELECTROMAGNETIC PHENOMENA SENSOR SYSTEM

CROSS-REFERENCE TO RELATED APPLICATIONS

The theory of intensity modulated optical fiber sensors, and examples of such sensors, are disclosed in the U.S. Government-owned inventions by Nicholas Lagakos et al., described in U.S. Pat. No. 7,020,354: Intensity Modulated Fiber Optic Pressure Sensor; U.S. Pat. No. 7,379,630: Multiplexed Fiber Optic Sensor System; U.S. Pat. No. 7,646,946: Intensity Modulated Fiber Optic Strain Sensor; U.S. Pat. No. 8,195,013: Miniature Fiber Optic Temperature Sensors, and others (collectively, the "U.S. Government Patents"). U.S. Ser. No. 14/222,225, filed Mar. 21, 2014 (the "Electromagnetic Phenomena Sensor Patent Application") discloses intensity modulated fiber optic sensors that measure electromagnetic phenomena such as electrical and magnetic fields, voltage, and current. The disclosures of the U.S. Government Patents and the Electromagnetic Phenomena Sensor Patent Application are incorporated herein by reference.

FIELD OF INVENTION

This invention relates to a system of intensity modulated fiber optic sensors for measuring physical phenomena in materials, including electromagnetic phenomena such as voltage, current, electric and magnetic fields.

BACKGROUND

In recent years, fiber optic technology has formed the basis for different types of sensors, such as microphones, pressure sensors, strain sensors, and others. Optical fiber sensors can use interferometry or intensity modulation, with the intensity modulated fiber optic sensors being simpler and less expensive.

Intensity modulated fiber optic sensors have the advantages of being highly accurate, EMI resistant, capable of being multiplexed, capable of long-distance sensing, physically robust, and physically simple when compared to alternative measurement approaches for measuring certain physical effects. The use of fiber optics for sensors in general, and for electromagnetic measurements in particular, addresses the accuracy, EMI sensitivity, safety, size, and robustness concerns inherent in existing electro-mechanical system measurement. Since fiber optics use light rather than electricity, a fiber optic sensor is generally insensitive to EMI and is therefore more efficient in an environment that has a large amount of electromagnetic energy. As a result, fiber optic sensors can be located adjacent to, or attached to, circuits that generate large electromagnetic fields without negative effects to either the measurement or the measuring equipment.

Multiple sensors allow for the measurement of multiple physical phenomena, such static or dynamic pressure, strain, electromagnetic phenomena, displacement, acceleration, or temperature. Multiple sensors allow for the measurement of multiple instances of electromagnetic phenomena, and the utilization of those measurements to calculate various derivative measurements of interest from those sensor outputs. For example, a system of electromagnetic phenomena sensors may be constructed so as to measure voltage and current at a common location on a circuit. These inputs are used, among other things, by electrical system operators to calculate real power, reactive power, and power factor in a circuit of interest, which are useful in understanding the operational characteristics of electric power systems and assist in the monitoring and control of such systems. For example, this information can be used to deliver power within appropriate voltage limits and to deliver power at an optimal power factor to minimize losses. Monitoring of these characteristics may also be indicative of problems occurring within the system and be used for predictive maintenance.

In order to acquire the necessary information, multiple sensors may be needed to measure multiple phenomena on a common circuit or upon multiple circuits. Currently, multiple instances of electromagnetic phenomena cannot be readily measured using a common system due to limitations inherent in the measurement technology utilized (such as those associated with ferromagnetic current transformers and potential transformers). Specifically, in the measurement of electric power systems, the devices traditionally used to measure voltage and current, for example, are based on different physical principles and therefore differ in their operating characteristics.

While electro-mechanical instrument transformers have been in use in electric power systems for many years, the accuracy of these devices is limited by a number of factors which impose significant measurement errors in actual use. Ferromagnetic effects, temperature variations, frequency instability and electrical coupling of the measurement circuit to the measured circuit are root causes of significant error that is inherent to traditional measuring devices. The differing underlying physical realities related to the different measuring techniques also means that the measurements taken by these different devices are not necessarily correlated with one another. Error correction and estimation processes are required in order to compensate for these sources of error and uncertainty, further reducing measurement accuracy, and introducing delays in the calculation of useful information. In addition, these devices are often physically complex, are sensitive to electromagnetic interference (EMI), can be dangerous to humans in operation or when maintenance is needed, and aren't physically robust.

Where accurate information regarding the operations characteristics of a given circuit is critical, such as in electrical power generation, transmission, and distribution systems, simultaneous measurement of multiple physical phenomena allows for superior monitoring and control of key system operating characteristics. What is needed is a system that uses a consistent and reliable measurement technique with a high degree of accuracy to take measurements of physical phenomena that can be readily collected and compared. The system disclosed allows the information necessary to understand the operational characteristics of electric networks to be measured with greater confidence and using a single system rather than multiple devices.

SUMMARY OF THE INVENTION

An aspect of the invention is directed to a system of fiber optic sensors for measuring multiple physical phenomena in materials or structures of interest, and particularly the measurement of electromagnetic phenomena. The system uses fiber optic sensors to measure multiple physical phenomena within a material or structure of interest, such as an electrical circuit, allowing for multiple measurements of the same phenomena at different locations, or for the measurement of different physical phenomena within a common structure or at multiple locations.

The fiber optic sensors used in the system share certain common characteristics, with modifications for each type of physical phenomena to be isolated and measured. The sensors each include an optical fiber bundle having a transmitting fiber and at least one receiving fiber. This fiber probe is then placed adjacent to a reflective surface that is part of or attached to a material. A housing may be included, and may be affixed to the optical fiber bundle at a first end and to the reflector body at a second end. The sensor can have one transmitting fiber and one receiving fiber, or can have one transmitting fiber and a plurality of receiving fibers. The reflective surface is spaced apart from the ends of the fibers and positioned so that light, transmitted through the transmitting fiber, is reflected by the reflective surface into at least one receiving fiber. A light sensing element is coupled to the second end of the at least one receiving fiber, so that in operation light from a light source, launched into the transmitting fiber, propagates through the fiber and emerges at the end, propagates a short distance from the end of the fiber, and is reflected at least partially by the reflector body back into the receiving fibers. The reflected light returns through the receiving fibers and is detected by a light sensing element.

In operation, the physical phenomena causes a displacement in the material, which causes a change in the distance between the fiber end and the reflective surface, modulating the amount of light received in the receiving fiber or fibers. Thus, the change in distance between the fiber ends and the reflective surface modulates the amount of light received by the light sensing element. The intensity of the light received is therefore modulated in relation to the physical effect of interest. Each sensor is constructed in order to isolate for a physical phenomena of interest, including, but not limited to, electromagnetic phenomena (such as voltage, current, electric field, magnetic field), static or dynamic pressure, strain, displacement, acceleration, or temperature. In each sensor application, the physical phenomena to be measured is indicated by the displacement of the material in response to the phenomena, and the displacement of the material is measured by the amount of light detected by the light sensing element.

In the system, multiple sensors may be used to obtain measurements of multiple instances of physical phenomena with high accuracy, using a single system rather than multiple measuring devices. The system includes multiple intensity modulated fiber optic sensors. Multiple sensors allow for the measurement of multiple physical phenomena, such as electromagnetic phenomena, and utilization of those measurements to calculate various derivative measurements of interest. Because of the large number of sensors that may be necessary or desirable, it is further advantageous to multiplex them in order to reduce the number of components required to construct the system. The present invention includes methods, using the systems described above, for multiplexing the sensors at multiple points within the system, thereby enabling measurement of multiple phenomena at lower total costs. Embodiments of the multiplexed sensor system can be constructed so as to measure phenomena at different locations and/or take different kinds of measurements at the same location or approximately the same location.

Embodiments of the multiplexed sensor system can be constructed so as to measure multiple physical characteristics, and can be used to take measurements at different locations and/or take different kinds of measurements at the same (or approximately the same) location or on a common structure. For example, a fiber optic sensor system could be used to monitor multiple electromagnetic phenomena (such as magnetic fields, electric fields, voltage, or current) within a material or structure of interest, such as an electrical circuit, while simultaneously measuring other physical phenomena, such as static or dynamic pressure, strain, electromagnetic phenomena, displacement, acceleration, temperature, or other physical phenomena in that common material or structure.

The system may include fiber optic sensor systems that measure electromagnetic phenomena, static or dynamic pressure, strain, displacement, acceleration, temperature, or other physical phenomena, in combination with one another. The system also provides for using multiple measurements of the same phenomena at the same (or approximately the same) location or in multiple locations. The system can be connected to an existing material or structure of interest or can be used to embed sensors within a structure or product for active monitoring.

DETAILED DESCRIPTION OF THE INVENTION

An aspect of the invention is directed to a system of fiber optic sensors for measuring multiple physical phenomena in materials or structures of interest, and particularly the measurement of electromagnetic phenomena. The system uses fiber optic sensors to measure multiple physical phenomena within a material or structure of interest, such as an electrical circuit, allowing for multiple measurements of the same phenomena at different locations, or for the measurement of different physical phenomena within a common structure or at multiple locations. The fiber optic sensor system can measure electromagnetic phenomena (such as voltage, current, electric fields, magnetic fields), and/or static or dynamic pressure, strain, displacement, acceleration, temperature, or other physical phenomena.

The disclosed system enables monitoring of an electrical circuit (or components of the electrical circuit) for voltage, current, or other physical phenomena. Measurement of individual inputs provides useful information to electrical power system operators, but when combined with additional inputs, provides the data required to calculate key performance measurements. For example, by measuring voltage and current synchronously at a common point in an alternating current circuit, the system can be used to accurately calculate real power, reactive power, and power factor at that location. This information allows system operators to monitor the circuit with a high degree of accuracy and permits for superior control of the electrical power system, enabling improvements in operating efficiency.

Operation of Intensity Modulated Fiber Optic Sensors

The principle of operation of the fiber optic sensors utilized in the system described herein share common characteristics and may be used to detect and measure a range of physical phenomena.

A fiber optic probe, consisting of a transmitting fiber for transmitting light and at least one receiving fiber for receiving light is placed adjacent to a reflective surface, with space between the probe end and the reflective surface. The reflective surface is either a part of, or is attached to, a material that exhibits a physical displacement in response to an electromagnetic phenomena. Many electromagnetic phenomena, such as the Lorentz Force, the magnetostrictive effect, the piezoelectric effect, the force explained by Coulomb's law, or the ionic force of attraction between ions of opposite charge, are known that will cause a physical force upon a material when that material is exposed to an electric field, magnetic field, voltage, or current. The physical force exerted upon the material due to the electromagnetic phenomena causes a physical displacement of the material that can be measured. The sensors may be selected and configured such that different properties can be isolated for measurement, such as electric field, magnetic field, voltage, alternating or direct current.

The physical displacement in the material in response to the electromagnetic phenomena is proportional to the magnitude of the electric or magnetic field, voltage, or current applied to the material. The displacement in the material causes a change in the distance between the fiber optic probe and the reflective surface. The transmitting fiber is coupled to a light source and the receiving fiber or fibers are connected to a light sensing element so that, in operation, the displacement of the material causes the light transmitted through the transmitting fiber to be reflected into the receiving fibers with an intensity that is modulated in a manner proportional to the displacement experienced by the material.

A fiber optic electromagnetic phenomena sensor may measure the displacement in a material that is produced by the electromagnetic phenomena known as the piezoelectric effect, with the displacement of the material being indicative of voltage. The piezoelectric effect, or piezoelectricity, refers to the ability of materials to convert mechanical energy into electrical energy and vice versa. Under the direct piezoelectric effect, piezoelectric materials, when subjected to mechanical stress, generate an electric charge proportional to that stress. Under the inverse piezoelectric effect, the same materials become physically strained when an electric field is applied, exhibiting a displacement of the material, with the displacement being proportional to the strength of the applied electric field. Thus, the amount of displacement experienced by the piezoelectric material is proportional to the potential difference between the faces of the material, indicating the electric voltage present.

Displacement of piezoelectric material is a function of the applied electric field strength and the properties of the piezoelectric material used, described as piezoelectric strain coefficients. Common piezoelectric materials include zinc oxide, aluminum nitride, lead zirconate titanate (PZT), lead magnesium niobate-lead titanate, gallium phosphate, quartz, tourmaline, and polyvinylidene fluoride (PVDF). The piezoelectric strain coefficients of these materials describe the proportional relationship between the applied electrical field and the mechanical displacements produced.

The relationships between an applied voltage or electric field and the corresponding displacement in a piezoelectric material element's thickness, length, or width are:

$$\Delta h = d_{33} V$$

$$S = d_{33} E$$

$$\Delta l / l = d_{31} E$$

$$\Delta w / w = d_{31} E \qquad \text{Equation 1.}$$

Where:
 l: initial length of piezoelectric element
 w: initial width of piezoelectric element
 $\Delta h$: change in height (thickness) of piezoelectric element
 $\Delta l$: change in length of piezoelectric element
 $\Delta w$: change in width of piezoelectric element
 d: piezoelectric coefficient of material in a given poling direction
  $d_{33}$ is the induced strain in the material in direction 3 per unit of electric field applied in direction 3.
  $d_{31}$ is the induced strain in the material in direction 1 per unit of electric field applied in direction 3.
 V: applied voltage
 S: strain (change in h/initial h of element)
 E: electric field To identify directions in a piezoelectric element, three axes are used. These axes, termed 1, 2, and 3, are analogous to X, Y, and Z of the classical three dimensional set of axes. The polar, or 3 axis, is parallel to the direction of polarization within the material. However, the geometry of the piezoelectric material can be a rectangular prism, a bar, a strip, or any other shape. Moreover, the piezoelectric strain coefficients of many materials are known properties that exhibit a linear relationship between the electric and mechanical state. Since the geometric dimensions, piezoelectric strain coefficients, and polarization directions of the material selected are known, and the direction of the electric field can be set in a desired orientation, the application of an electric field to the material will produce a displacement in the material in known direction and in proportion to the strength of the electric field.

In operation, the piezoelectric element is connected to a voltage source of interest. The material experiences a physical displacement in response to the applied voltage, consistent with the displacement equation described in Equation 1. While the voltage is applied, light is launched from the light source into the transmitting fiber and propagates through the transmitting fiber. The light then emerges at the end of the fiber, propagates a very short distance, and is reflected by the reflective surface of the piezoelectric material into the receiving fibers. The light then propagates through the receiving fibers, and is detected by light sensing element. The increase or decrease in the distance between the optical fiber and the piezoelectric material will cause a change in the amount of reflected light received in the optical receiving fibers and sensed by the light sensing element. Thus, the fiber optic probe measures the displacement of the piezoelectric material, which is proportional to voltage in the circuit of interest.

Figure 1:
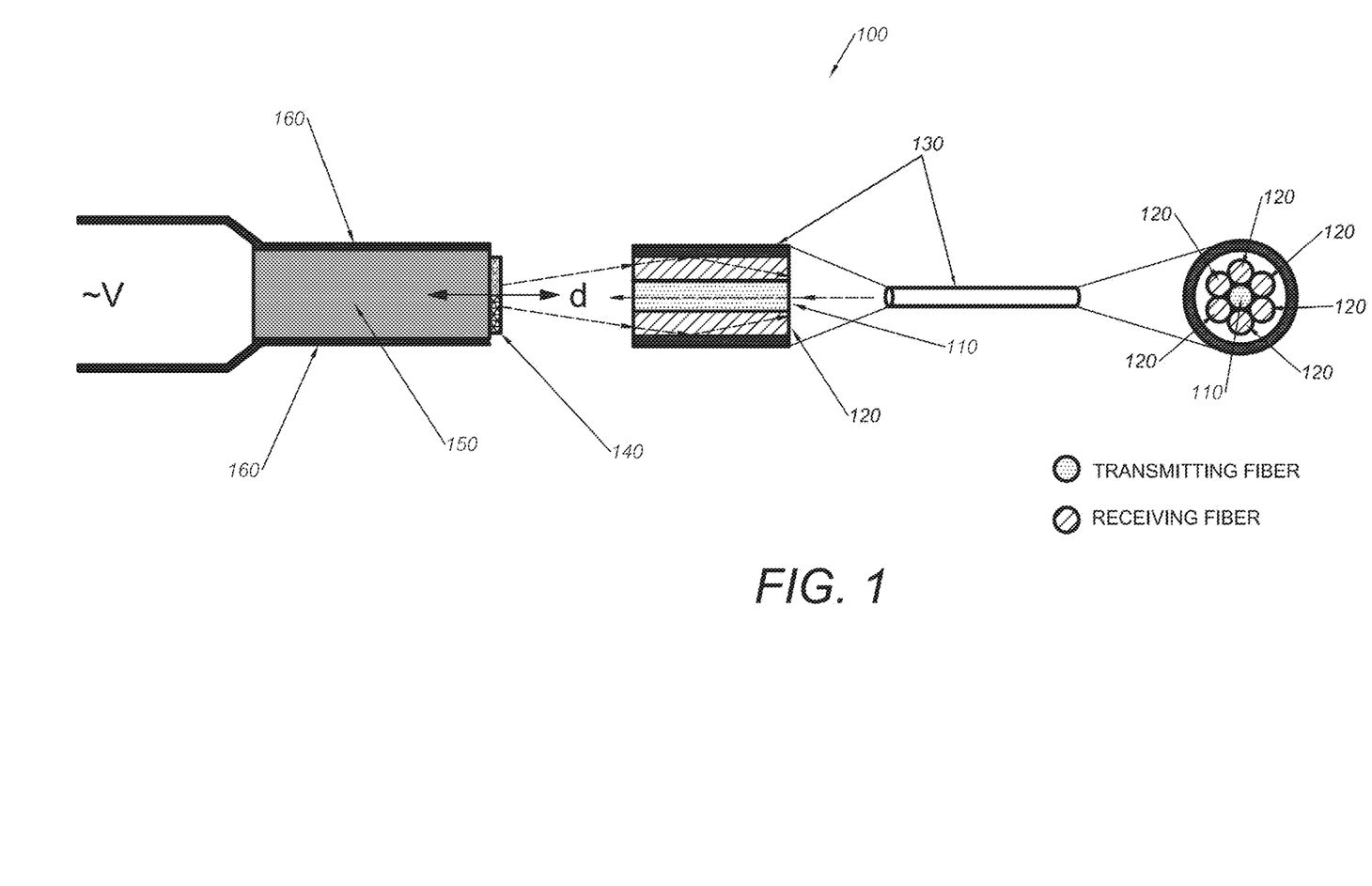
FIG. 1 shows an embodiment of a fiber optic electromagnetic phenomena sensor.

FIG. 1 shows an electromagnetic fiber optic sensor 100 featuring a fiber probe and a material that exhibits a physical displacement in response to an electromagnetic field. In FIG. 1, the displacement measured is caused by the piezoelectric effect described in Equation 1, which measures voltage and electric fields. A fiber bundle featuring a transmitting fiber 110 having a first and second ends is placed adjacent to a reflective surface 140. The first end may have a polished finish and the second end is coupled to a light source (not shown). The sensor may use an LED emitting at 850 µm as the light source with a silicon PIN diode as the light sensing element (not shown). However, other light sources, such as lasers, and other light sensing elements may be used. The fiber bundle also features a multitude of receiving fibers 120 disposed around the transmitting fiber with each receiving fiber having first and second ends. The first ends may also be polished and the second ends may be coupled to the light detecting element. The fiber bundle is constructed and arranged as described in FIG. 1 above, to form a multi-fiber probe. The fiber bundle is inserted into a tubing 130 so the fiber bundle consisting of the transmitting fiber 110 and receiving fibers 120 are contained within the tube, forming a probe. The fiber probe is positioned such that the first end of the transmitting fiber and the first end of each receiving fiber is adjacent to the reflective side 140 of piezoelectric material 150 to be measured that exhibits a physical displacement when subjected to a voltage, with space between the first fiber end and the reflective side of the material.

The piezoelectric material may be a rectangular prism of PZT material. The material 150 can also have an attached reflective body or coating, layer, or other reflective material 140 such as a metal (aluminum, beryllium, chromium, copper, gold, molybdenum, nickel, platinum, rhodium, silver, tungsten, and/or an alloy of any of these or other reflective metals). Alternatively, the material chosen may be polished, such that the material and the reflector are part of the same body.

In operation, an electric field or voltage (denoted "V") is introduced to the piezoelectric material in a given direction by attaching electrodes 160 to the material 150 in a desired orientation. The introduction of a voltage in the material will cause the material to display the piezoelectric effect, whereby the material experiences a physical displacement dependent upon the poling of the material and the piezoelectric coefficient of the material. Here, as shown in FIG. 1, the force exerted upon the material results in displacement in the material in a known direction. The sensor can be constructed such that the displacement is in the direction of the fiber optic probe, changing the distance between the material and the optical fibers. While the force is applied to the material, light from the light source is launched into the transmitting fiber and propagates through the transmitting fiber. The light emerges at the opposite end of the probe, propagates a short distance, and is reflected by the reflective surface of the material and into the receiving fibers. The light then propagates through the receiving fibers, and is detected by the light sensing element. Thus, the intensity of the light coupled into the receiving fibers modulates in a proportional relationship to the voltage across the piezoelectric material.

The type of fiber employed as shown in FIG. 1 is generally an optical fiber having a core that is preferably made of glass. The cladding may be plastic or some other material. In a preferred embodiment fibers with a high numerical aperture are used. Generally fibers with a numerical aperture of >0.2 are employed. A high numerical aperture provides for greater efficiency in the coupling and transmission of light. The fiber may be a multimode fiber. Multimode fibers and fibers featuring high numerical apertures are not required, however. When employed in systems that have a great distance between the source and the reflective side of the material a fiber having a high numerical aperture is not critical. The transmitting and receiving optical fibers in the sensors can be selected based on the sensor design and desired application, and are not limited by the material, numerical aperture, or diameters of the specific examples herein.

Generally, multimode fibers with a combination of a thick core and thin clad fiber are preferred. Light incident on clad is lost, thus it is beneficial for the core to be as close in proximity to the outer perimeter of the clad as possible to ensure efficient light coupling in the core. Light coupling within the fiber is maximized with a thick core thin clad structure. This however, does not limit the use of fibers in this device to multimode fibers with thick core thin cladding structures. Varying degrees of effectiveness and light coupling are possible with other fiber configurations.

According to one embodiment of the sensor, one end of the fiber has a polished finish and the opposite end of the transmitting fiber is coupled to the light source (not shown). The first ends of the receiving fiber or fibers also feature a highly polished finish, with the opposite ends coupled to the light sensing element (not shown). The optical fiber may feature a 200 µm glass core, and 230 µm plastic clad, a 500 µm Tefzel plastic coating, with a numerical aperture of approximately 0.37. The plastic coating is stripped and epoxy is applied to the fibers so the fibers form a symmetric bundle. The fiber bundle is inserted into a tubing 130 so the fiber bundle is contained within the tube, forming a probe. The fiber probe is positioned such that the first end of the transmitting fiber and the first end of each receiving fiber are adjacent to the reflective surface with space between the first fiber end of both the transmitting and receiving fibers and the reflective surface. A broad dynamic sensitivity maximum has been found for a probe-reflector separation between 180 and 250 µm, but other separations may be preferable based upon the construction of the probe (i.e.—the number of fibers utilized). Alternatively, a single fiber may be used as both the transmitting and receiving fiber or the fiber probe may contain a single transmit fiber and a single receive fiber. However, any combination of fibers may be used to form the probe.

The light sensing element may be a silicon PIN diode, and the light source may be an LED. LEDs represent an efficient way to launch light into the fiber probe. LEDs are commercially available, generally low cost, and feature low noise operation in a fiber system. LEDs also tend to be very stable over extended periods of time. Laser diodes may also be used as the light source, although they increase the expense and complexity of the system. Current laser diodes also tend to introduce additional noise to the sensor measurement system. One suitable LED for use as a light source is an Optek OPF370A LED emitting light at 850 µm wavelength. The light source is coupled to the transmitting fiber and the light sensing element is arranged to receive light from the receiving fiber or fibers of the sensors.

The displacement measured by the sensor can be produced by a number of electromagnetic phenomena other than the piezoelectric effect described above. Other electromagnetic phenomena sensors can measure the displacement caused by the Lorentz Force, the magnetostrictive effect, the force explained by Coulomb's Law, or the ionic force of attraction between ions of opposite charge. The physical displacement in the material is caused by a force exerted upon the material due to an electromagnetic phenomena, with embodiments that can be selected whereby the electric or magnetic field, voltage, or current are isolated for measurement. Other fiber optic sensors, operating under a similar theory of intensity modulation, can be used to construct different physical phenomena sensors for the measurement of electromagnetic phenomena (such as voltage, current, electric or magnetic field), static or dynamic pressure, strain, displacement, acceleration, temperature, or other physical phenomena.

Evaluation of Single Fiber and Multiple Fiber Sensors

As noted above, the fiber optic probe used in the sensor system described herein may consist of one or more optical fibers. The measurement sensitivity of sensors using such a probe can be determined and set by establishing a set probe-reflector distance depending on the method of fiber optic probe construction employed. It will be appreciated, however, that any combination of number of fibers may be used to construct the probe and select the distance between the probe and the reflector based upon the concepts described.

Figure 2:
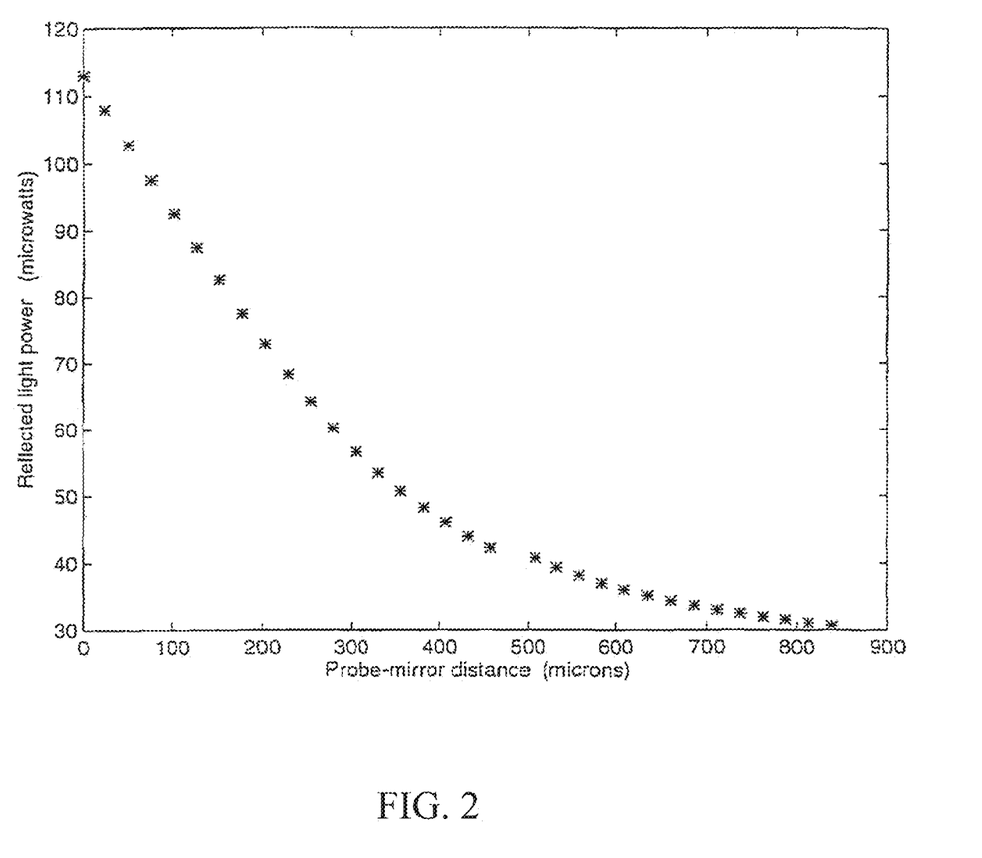
FIG. 2 illustrates the dc displacement sensitivity of a one-fiber probe sensor versus the probe end to reflector distance.

FIG. 2 illustrates the displacement sensitivity of a one-fiber probe, which may be part of any of the sensor utilized in the system disclosed herein, including the sensor in FIG. 1. The displacement sensitivity of the one fiber probe can be studied by mounting it on a micrometer translator which can be displaced manually against a mirror mounted on a piezoelectric transducer which can be vibrated electrically. The probe may be displaced manually against the mirror using a micrometer translator and the results recorded. Results are shown in FIG. 2 where the power of the reflected light coupled into the same fiber is plotted vs. the probe-reflector distance. As can be seen from this figure, maximum displacement sensitivity is achieved in the 0-150 µm probe-reflector distance.

Figure 3:
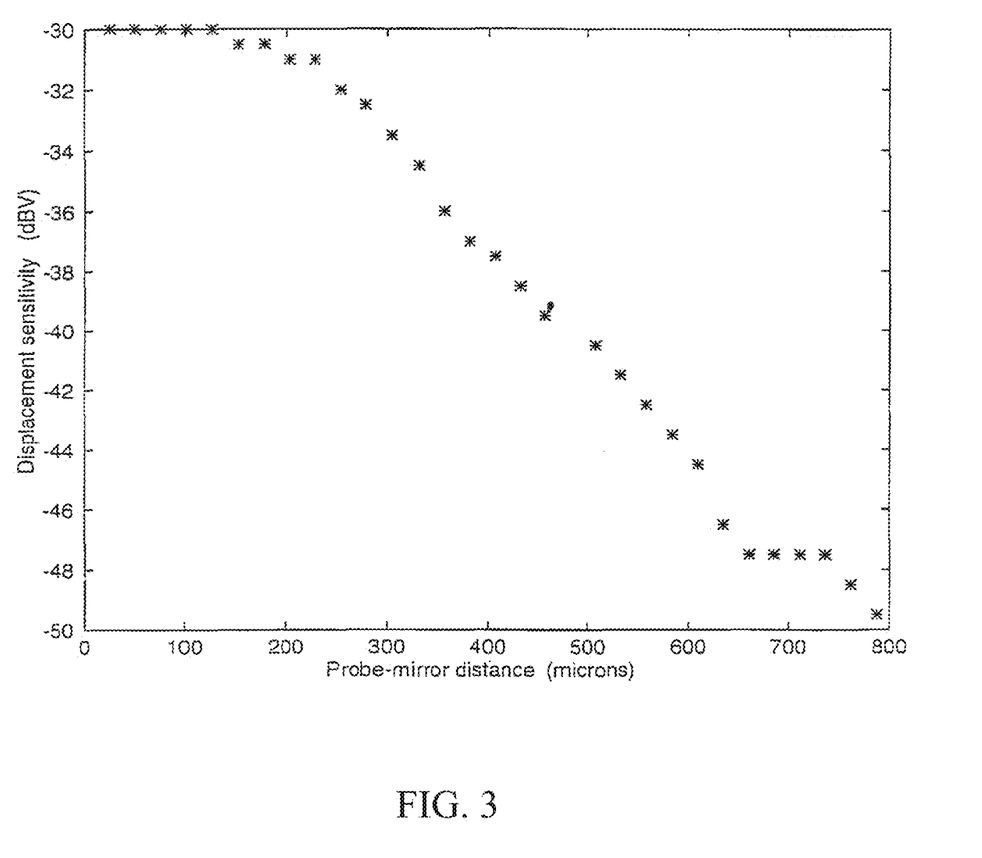
FIG. 3 illustrates the ac displacement sensitivity of a one-fiber probe sensor versus the probe end to reflector distance.

The one fiber probe can also be dynamically displaced against the mirror by vibrating the PZT transducer electrically. The displacement amplitude of the vibrating mirror can be obtained from the output of a reference accelerometer mounted close to the mirror. Results are shown in FIG. 3, which illustrates the ac displacement sensitivity as a function of the probe-mirror distance. As can be seen from this figure, the sensitivity is maximum and approximately constant in the 0-150 µm region, in agreement with the dc displacement results of FIG. 2. These results illustrate that an optimum operating distance of the one fiber probe end from the reflecting surface is about 60 µm and the optimum operating region is 0-120 µm, for this type of fiber probe embodiment, although other operating distances can be used.

Figure 4:
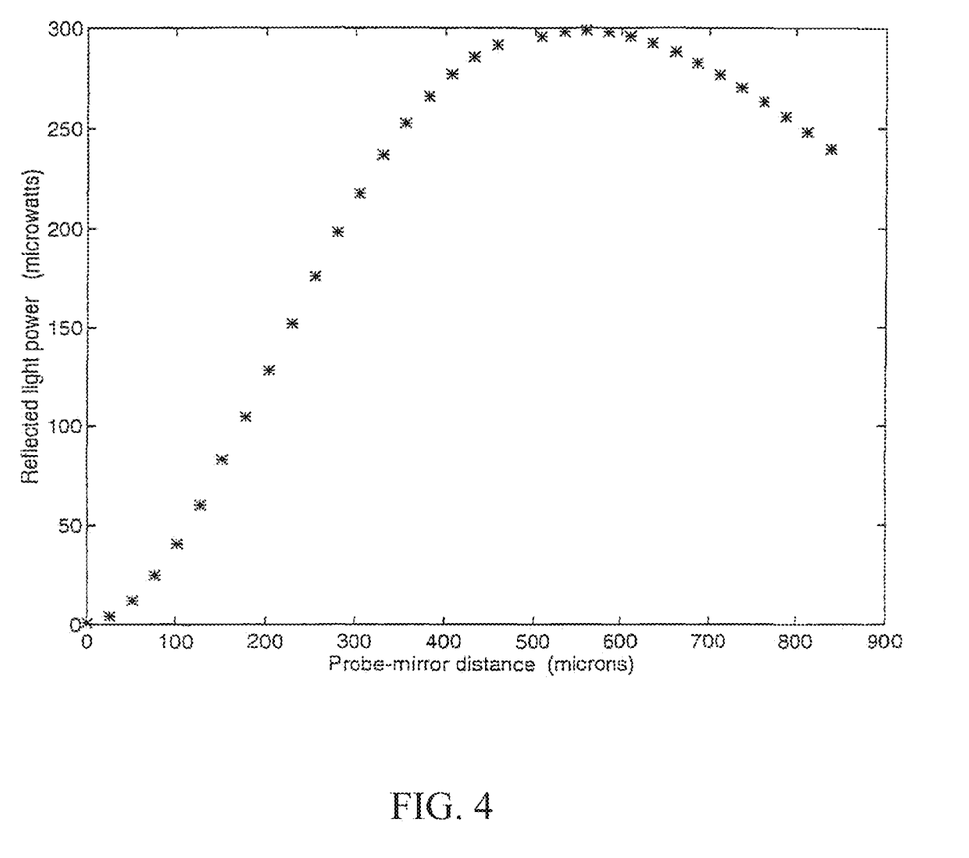
FIG. 4 illustrates the dc displacement sensitivity of a seven fiber probe sensor versus the probe end to reflector distance.

FIG. 4 illustrates the dc displacement sensitivity of a seven-fiber probe, which was studied in a similar way to that of the one-fiber probe. The seven fiber probe comprises one transmitting fiber and six receiving fibers. In FIG. 4, the reflected light power coupled into the six receiving fibers is plotted vs. the probe-mirror distance. The maximum displacement sensitivity is achieved for a probe-mirror distance of about 180-250 µm and is about $9.38 \times 10^{-11}$ W/A, where A is equal to $10^{-8}$ cm. By comparing the results in FIGS. 2 and 4, it is seen that the region of maximum sensitivity of the seven-fiber probe is different than that of the single fiber probe. For example, the maximum sensitivity region for the one fiber probe is found at close to zero probe-mirror distance, while the maximum sensitivity region for the seven fiber probe is achieved at a greater distance. Another difference is that with the seven fiber probe, significantly higher light power is detected.

Figure 5:
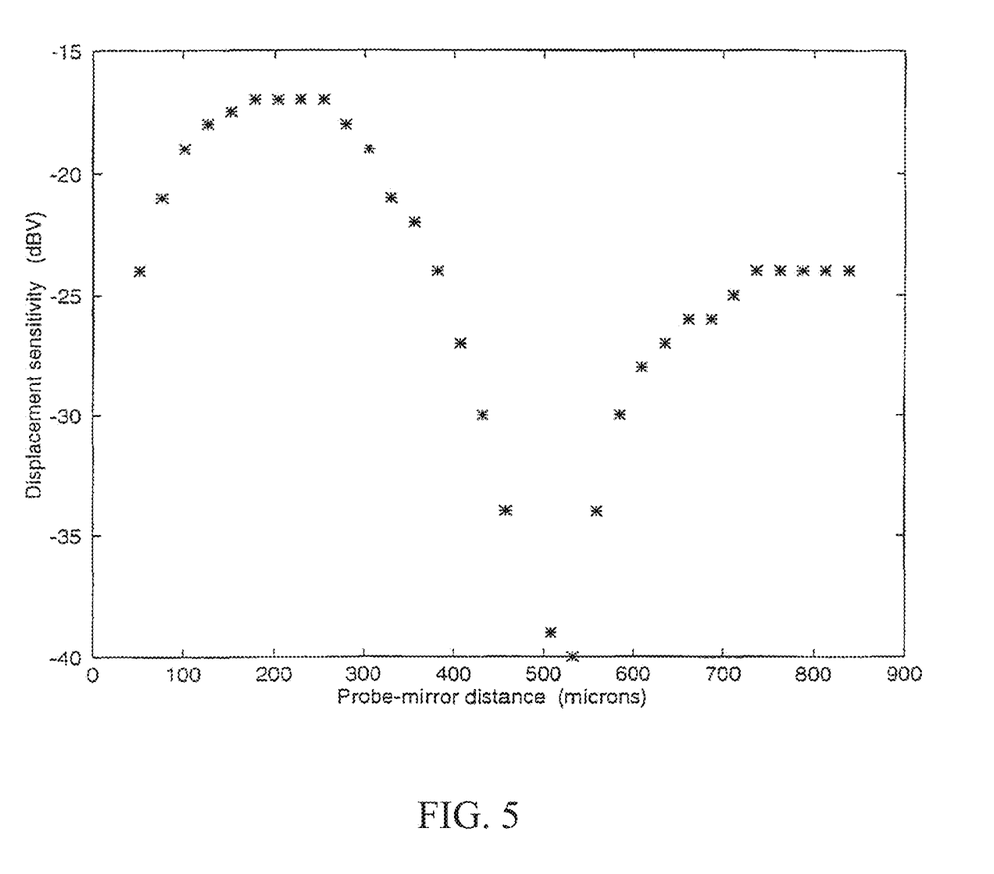
FIG. 5 illustrates the ac displacement sensitivity of a seven fiber probe sensor versus the probe end to reflector distance.

FIG. 5 illustrates the displacement sensitivity plotted as a function of the probe mirror distance for the seven-fiber probe. These results were obtained in a similar way as the FIG. 3 results for the one-fiber probe. As can be seen from this figure, maximum displacement sensitivity is achieved in the probe-mirror distance range of 180-250 µm, in agreement with the dc displacement results of FIG. 4. This maximum displacement sensitivity range indicates that an optimum probe-reflecting surface distance can be about 220 µm. From FIGS. 5 and 3, it is apparent that the maximum ac displacement sensitivity of the seven fiber probe is about 13 dB higher than that of the one fiber probe. Thus, the increased sensitivity difference and the high cost of the multimode coupler used in the one fiber probe make a seven-fiber probe sensor better for some applications, even though the one fiber probe sensor uses only one fiber instead of seven. In other applications, such as remote sensing applications in which longer fiber lengths are needed, a one-fiber probe sensor may be preferable.

Based on the results shown in FIG. 5, the displacement sensitivity of the seven fiber probe was calculated from the signals of the probe and the reference accelerometer, and was found to be equal to $6.35 \times 10^{-11}$ Watts per Angstrom (W/A). This result is slightly less than the $9.35 \times 10^{-11}$ W/A sensitivity calculated from the dc displacement procedure, the results of which are shown in FIG. 4. PIN detectors can detect a fraction of a picowatt ac signal. Using the information discerned from FIGS. 2 to 5, the reflecting material of a sensor construction can be placed at an optimum distance from the probe end for maximum sensitivity. Thus, the sensors, such as those described in FIG. 1, can be constructed to position the probe at an optimum reflector-probe end distance. The optimum reflector-probe end distance can be found in practice by adjusting the distance, monitoring the detected light from the receiving fibers, and taking into account the FIG. 4 and FIG. 5 calibration for the seven fiber probe. Similarly, FIGS. 2 and 3 can be used to determine the optimum probe end-reflector distance for a one-fiber probe.

Operation of Fiber Optic Sensor System

Multiple sensors allow for the measurement of multiple physical phenomena, such as current and voltage, using a common system, with the sensor outputs used calculate various derivative measurements of interest. For example, a system of electromagnetic phenomena sensors may be constructed so as to measure multiple electromagnetic phenomena on a common conductor, allowing for accurate measurements of voltage and current at the common location. The derivation of these measurements can be used to calculate metrics such as real power, reactive power, apparent power, power factor, or phase angle, that are used to monitor and control electric power systems, and thereby providing for greater system efficiency in alternating current circuits. Similar metrics are also used to meter and bill end users for electric power use.

For example, in a three-phase alternating current circuit, apparent power is the product of voltage and current (amperage); reactive power is the product of the root mean square of voltage and current, multiplied by the sine of the phase angle between the voltage and the current; power factor is the ratio of real power to apparent power, and real power (or true power) is the root mean square of voltage and current, multiplied by the cosine of the phase angle between the voltage and the current. These calculations require multiple inputs (such as voltage and current), and a sensor system is desirable that can provide measurements of each of these multiple inputs using multiple fiber optic sensors. For this reason, it may be desirable that multiple sensors be used in order to measure multiple instances of the same phenomena or measure multiple kind of different phenomena, either on a common structure or at different locations.

One application of the disclosed invention is in the field of electrical power monitoring and control systems, which requires specialized sensor devices to detect electric fields, magnetic fields, voltage, and current. These inputs are used, among other things, by electrical system operators to determine real power, reactive power, and power factor in a circuit of interest. For example, this information can be used to deliver power within appropriate voltage limits and to deliver power at an optimal power factor to minimize losses. In order to obtain the necessary information to calculate these figures, multiple sensors may be needed to measure multiple phenomena on a common circuit or on multiple circuits.

The fiber optic sensors measure these phenomena with high accuracy and can be incorporated into a common system whereby multiple phenomena can be measured simultaneously. The outputs from the sensors can be maintained in an analog state or can be converted to a digital signal for rapid calculation of various derivative measurements, such as those described above, that allow for a better understanding of the operating characteristics of the structure of interest, such as an electric circuit. Given the large number of sensors that may be necessary or desirable in a system, it is also desirable to multiplex them in order to reduce the number of components necessary to construct the system. Multiplexing of the sensors can be done at multiple points within the sensor system, further reducing cost and system complexity.

Figure 6:
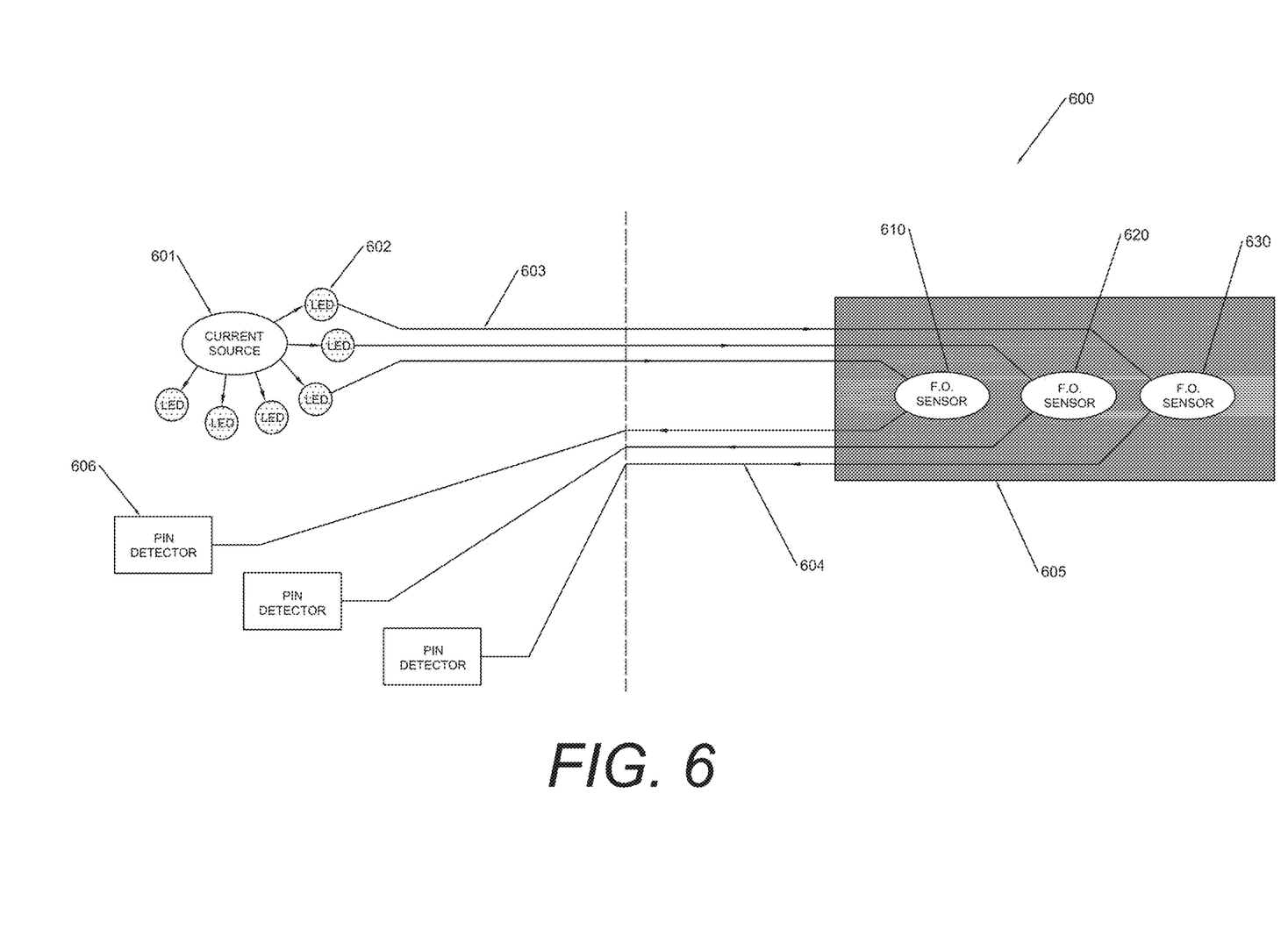
FIG. 6 illustrates an embodiment of a fiber optic sensor system.

FIG. 6 illustrates a fiber optic sensor system 600 arranged to measure physical characteristics at several locations or take different kinds of measurements at the same location. Here, the sensor system consists of a current source 601 supplying six light sources 602, and each light source supplying light to a single fiber optic sensor. The light sources may be LEDs, with each LED is arranged to transmit light into a length of optical fiber 603 and each fiber providing light to a single sensor.

Each of the optical fibers 603 extends to a different sensor 610, 620, and 630 and serves as the transmitting optical fiber for that sensor. Receiving fibers of the sensors 604 receive the reflected light, as discussed in previous paragraphs related to FIG. 1. Here, six fibers are used to receive the reflected light. The receiving fibers then transmit the light to the light sensing elements 606. The light sensing elements may be, for example, PIN detectors. Alternatively, the receiving fibers can be coupled to lengths of another wide diameter fiber via connector pairs for transmission to the light sensing elements. Each of the light sensing elements converts the received light from the fiber optic sensors to electrical signals. The output electrical signals from the light sensing elements are proportional to the measured physical phenomena in the structure or material of interest, allowing for the physical phenomena to be measured. The fiber optic sensors 610, 620, and 630 can each be a seven-fiber electromagnetic phenomena sensor, configured to measure voltage or current. Alternatively, or in addition, the fiber optic sensors can be static or dynamic pressure sensors, strain sensors, electromagnetic phenomena sensors, displacement sensors, acceleration sensors, temperature sensors, or sensors of other physical phenomena.

As discussed above, the measurement of multiple instances of electromagnetic phenomena provides useful information to electrical system operators regarding the operating characteristics within a circuit of interest. The sensors can be used to determine voltage and current at multiple points in a circuit of interest. In turn, these inputs can be used calculate real power, reactive power, power factor, or other electric-power related metrics of interest that are derived from measurement of electromagnetic phenomena, at various points in a circuit of interest or at a common (or approximately common) location. Alternatively, the sensors could be electromagnetic phenomena sensors with a different number of fibers, or the sensors could include strain sensors, pressure sensors, temperature sensors, or other fiber-optic based physical sensors, or a combination of any of these sensors.

The sensors 610, 620, and 630 may be attached to a structure of interest, such as a conductive bus bar 605 in an electrical network. Other sensors may also be attached to the structure of interest. Alternatively, the sensors may be embedded within a structure or material of interest (rather than upon the face of the structure) in order to sense strain, pressure, temperature, displacement, electromagnetic, or other physical phenomena at various points within the structure. For example, a common current source can power six LEDs at 100 mA current, and each LED can provide light to power a single fiber optic sensor. Alternatively, the sensor system may be further multiplexed whereby a single light source can provide light to power multiple fiber optic sensors, allowing for a system consisting of a multitude of sensors.

The addition of other physical measurements allows for additional information regarding the operating characteristics of the structure or system of interest. For example, temperature rises in the structure of interest, such as a power transformer, may be indicative of operational or structural problems. The multiplexed sensor systems can also be used to compensate for potential sources of noise in the measured signals. For example, two sensors can be located near each other so they are exposed to approximately the same temperature, with one of them being exposed to a reference signal (such as strain or pressure), and the other exposed to the signal to be sensed. The detected results can be compared to eliminate or minimize noise effects, such as those that may arise due to temperature changes or to compensate for temperature dependency within the material to be measured. Alternatively, the multiplexed sensor systems of FIG. 6 can be used to measure a combination of multiple physical phenomena in addition to, in the alternative to, or in combination with the electromagnetic phenomena sensors, including measurements of static or dynamic pressure, strain, electromagnetic phenomena, displacement, acceleration, temperature, or other physical phenomena.

Figure 7:
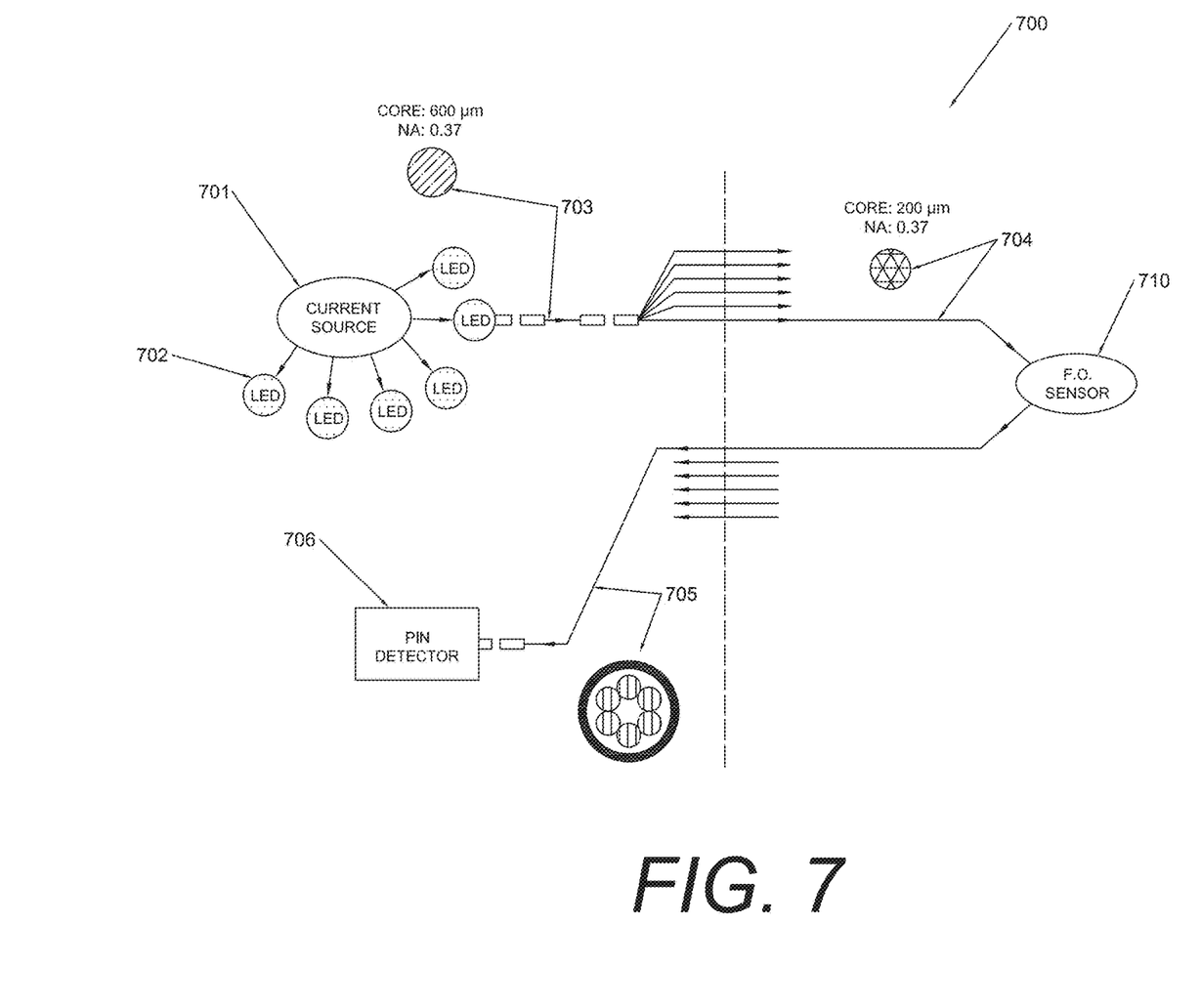
FIG. 7 illustrates an alternative embodiment of a fiber optic sensor system.

FIG. 7 illustrates an exemplary fiber optic sensor system 700 in which a current source 701 powers a plurality of light sources, and each light source transmits light into a large diameter multimode fiber, in order to power multiple sensors. The sensor system allows a current source to power a plurality of lights sources, such as LEDs, and each LED then transmits light into a large diameter multimode fiber. This allows a single current source supplying power to six light sources, such as LEDs 702, with each LED supplying light to six sensors. In this configuration, the system could include 36 total sensors.

For each light source, a larger diameter fiber 703 is arranged to receive light from the light source via a connector pair. A connector splits the light from the large diameter multimode fiber into six smaller diameter multimode fibers 704. A connection is arranged at the end of the larger diameter optical fiber 703 to couple light into six smaller diameter fibers 704. For example, the larger diameter fiber may have a core diameter of 600 microns, and the smaller diameter fibers may have core diameters of 200 microns with numerical apertures of 0.37.

Each smaller diameter fiber 704 transmits the light to an individual sensor 710, which may be fiber optic electromagnetic phenomena sensors. One or more fiber optic sensors are attached to a structure or structures in which a given physical phenomena or combination of physical phenomena is to be measured. Reflected light is transmitted from each of the sensors through six receiving fibers 705 to a light detecting element 706, in this embodiment a PIN photodetector. Since the output electrical signal from the light sensing element is proportional to the physical phenomena in the structure to which the sensor is attached, the desired physical characteristic to be measured can be determined.

In this example, each light source supplies light to six sensors via the six smaller diameter fibers receiving light from the larger diameter fiber. The sensors 710 can be fiber electromagnetic phenomena sensors as illustrated in FIG. 1, or any other desired optical fiber based sensor, including but not limited to, pressure sensors, strain sensors, temperature sensors, and displacement sensors. As with FIG. 6, the multiplexed sensor systems of FIG. 7 can be used to measure strain, pressure, temperature, displacement, acceleration, electromagnetic phenomena, or other physical phenomena at various points within a common structure or material, or may be used to sense various phenomena at multiple locations or within multiple structures, such as on each of the phases of a multiple-phase electric power system.

A combination of sensor types can also be used to compensate for sources of noise. For example, the sensors can be placed at known points upon a material or structure of interest to determine, via a trilateration, triangulation, or similar calculations, the source of a potential signal of interest within a circuit of interest. For example, using measurements received by multiple sensors receiving a signal (such as an electric wave) at known times, the source of the signal can be determined.

Figure 8:
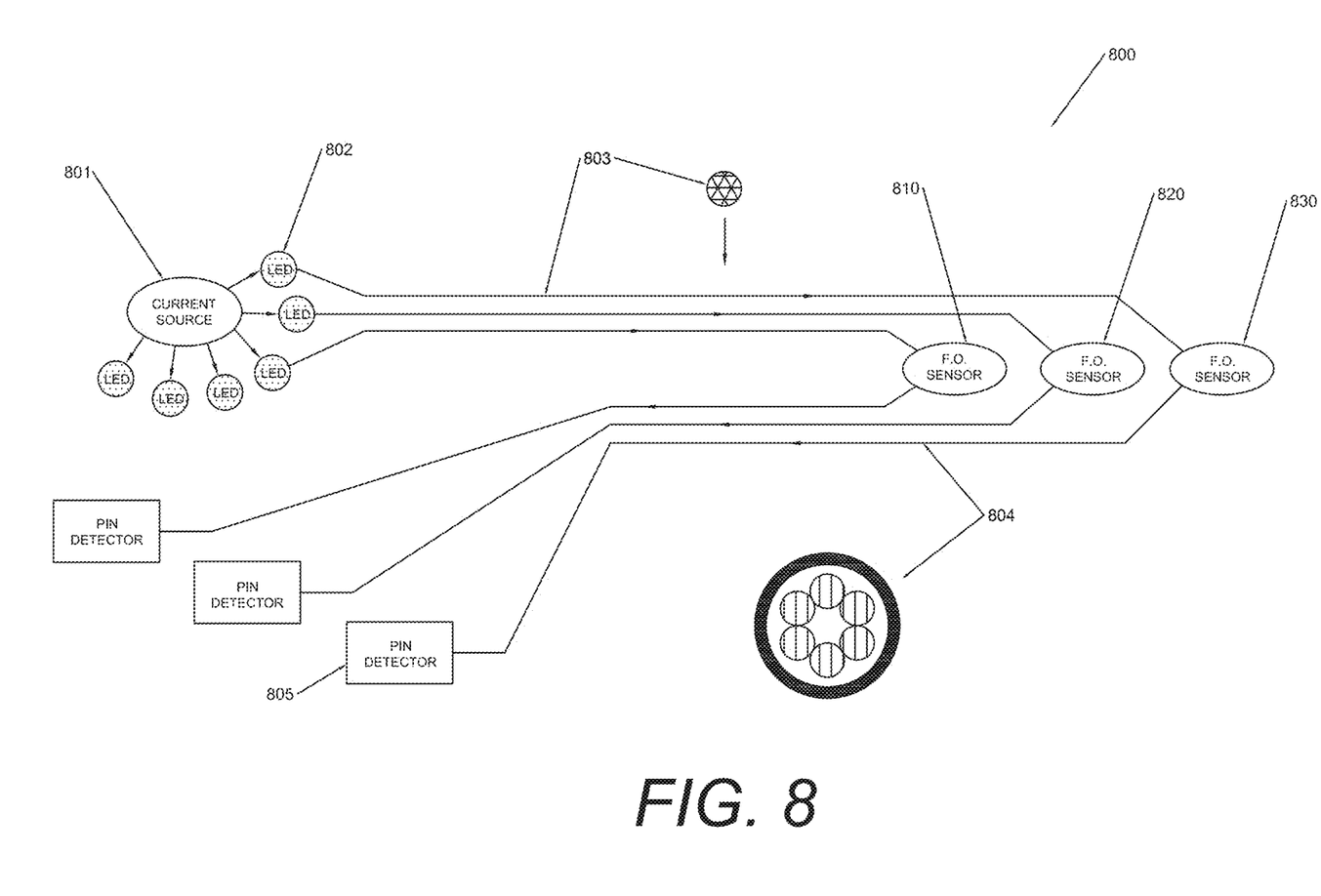
FIG. 8 illustrates an alternative embodiment of a fiber optic sensor system.

FIG. 8 illustrates a fiber optic sensor system 800 arranged to measure physical characteristics at several locations (as opposed to the embodiment presented in FIG. 6 in which measurements are made upon a common structure). FIG. 8 illustrates the ability to take measurements on multiple faces of a common structure or upon multiple structures. Here, the sensor system consists of a current source 801 supplying six light sources 802, such as LEDs, with each light source supplying light to a single fiber optic sensor. Each light source is arranged to transmit light into a length of optical fiber 803, with each fiber providing light to a single sensor.

For each light source, each fiber 803 is arranged to receive light via a connector pair. As an example, each fiber may have a core diameter of 200 microns with numerical apertures of 0.37. Six 200 micron core diameter fibers can be efficiently supplied with light, allowing each current source to power six LEDs, which in turn, supply light to six transmitting fibers, and allow each current source to power six sensors.

Each of the optical fibers 803 extends to a different sensor 810, 820, and 830 and serves as the transmitting optical fiber for that sensor. Receiving fibers of the sensors 804 receive the reflected light, as discussed in previous paragraphs related to FIG. 1. Here, six fibers are used to receive the reflected light. The receiving fibers then transmit the light to the light sensing element 805, here a PIN photodetector. In this embodiment, the six receiving fibers 804 transmit light from the sensors via connectors to a length of larger diameter optical fiber. The light is then transmitted to the light sensing element. The light sensing element converts the received light from the fiber optic sensors to electrical signals. The output electrical signal from each light sensing element is proportional to the measured physical phenomena in the structure or material of interest, allowing for measurement of multiple physical phenomena to be determined. The sensors 810, 820, and 830 can each be an electromagnetic phenomena sensor, such as the seven-fiber sensor as shown in FIG. 1. Alternatively, the sensors may be any other desired optical fiber based sensor, such as static or dynamic pressure sensors, strain sensors, other electromagnetic phenomena sensors, displacement sensors, acceleration sensors, temperature sensors, or other sensors configured to measure physical phenomena.

In an alternative embodiment, a connection is arranged at the end of the six smaller diameter fibers to couple light into a larger diameter optical fiber. For example, the larger diameter fiber may have a core diameter of 600 microns, and the smaller diameter fibers may have core diameters of 200 microns, all with numerical apertures of 0.37. However, coupling the light from the multiple receiving fibers of the sensor into a single, larger diameter fiber, such as single 600 micron fiber, may be desirable for applications where the light is being transmitted over longer distances. The multiplexed sensor systems of FIG. 8 can be used to measure a combination of multiple physical phenomena in addition to, in the alternative to, or in combination with the electromagnetic phenomena sensors, including measurements of strain, pressure, temperature, displacement, or other physical factors.

Each of the embodiments described above describes a particular method for multiplexing fiber optic sensors, although many other variations or modifications can be envisioned. Although this invention has been described in relation to the exemplary embodiments, it is well understood by those skilled in the art that other variations and modifications can be affected on the preferred embodiments without departing from the scope and spirit of the invention as set forth herein and within the claims.

The invention claimed is:

1. A fiber optic sensor system comprising:
   at least two multiplexed fiber optic sensors;
      each fiber optic sensor being configured to measure physical phenomena, wherein at least one of the multiplexed fiber optic sensors is configured to measure an electromagnetic phenomena as the physical phenomena, and
      each fiber optic sensor including at least one optical fiber arranged to transmit light from a light source and at least one receiving optical fiber arranged to receive light; and
   at least one light sensing element for each of the sensors arranged to receive light from the at least one receiving optical fiber for each of the sensors;
   wherein the at least two multiplexed fiber optic sensors are arranged to receive light from a light source, and to modulate the received light in response to physical phenomena detected by the sensors, and wherein at least one fiber optic sensor is placed in close proximity to at least one other fiber optic sensor such that one fiber optic sensor is configured to sense a reference signal for comparison to a signal of interest sensed by the other fiber optic sensor to reduce or eliminate noise; and wherein the modulated light from each sensor is detected by the at least one light sensing element for the sensor; and wherein the system is configured to measure multiple physical phenomena.

2. The sensor system according to claim 1, wherein the system measures at least one measurement of voltage and at least one measurement of current.

3. The sensor system according to claim 1, wherein at least one fiber optic sensor is a voltage sensor and at least one fiber optic sensor is a current sensor.

4. The sensor according to claim 3, wherein the outputs from the fiber optic sensors are used to calculate at least one of power, power factor, real power, apparent power, reactive power, the root-mean-square of voltage and current, or the phase angle between voltage and current or between voltages.

5. The sensor system according to claim 1, wherein the fiber optic sensors are at least one of static or dynamic pressure sensors, strain sensors, electromagnetic phenomena sensors, displacement sensors, acceleration sensors, or temperature sensors.

6. The sensor system according to claim 1, further comprising at least one light source.

7. The sensor system according to claim 6, wherein the at least one light source is powered by a common current source.

8. The sensor system according to claim 6, wherein the light source is a light emitting diode or a laser.

9. The sensor system according to claim 1, wherein the light sensing element is at least one of a PIN detector, a photodiode, a photomultiplier tube, or a semiconductor-metal detector.

10. The sensor system according to claim 1, wherein the light sensing element converts the light received from the sensor into an electrical signal.

11. The sensor system according to claim 1, wherein the outputs from each light sensing element are used to compare multiple instances of a single physical phenomena.

12. The sensor system according to claim 1, wherein the at least one receiving optical fiber comprises a plurality of receiving fibers.

13. The sensor system according to claim 12, wherein the plurality of receiving fibers consists of six fibers.

14. The sensor system according to claim 1, wherein the fiber optic sensors take measurements of a common structure.

15. The sensor system according to claim 14, wherein the common structure is an electrical circuit.

16. The sensor system according to claim 14, wherein the common structure is a single phase of an electrical transmission line.

17. The sensor system according to claim 14, wherein the common structure is a transformer located in an electrical generation, transmission, or distribution substation.

18. The sensor system according to claim 14, wherein the common structure is a power transformer.

19. The sensor system according to claim 14, wherein the common structure is a conductor in an electrical network.

20. The sensor system according to claim 1, wherein the fiber optic sensors are attached to different structures.

21. The sensor system according to claim 20, wherein the structures are the multiple phases of an electrical power system.

22. The sensor system according to claim 1, wherein the system comprises at least three fiber optic sensors, including at least one voltage sensor, at least one current sensor, and at least one temperature sensor.

23. The sensor system according to claim 1, wherein the system comprises at least five fiber optic sensors, including at least two voltage sensors, at least two current sensors, and at least one temperature sensor.

24. An electromagnetic phenomena data acquisition system comprising:
   at least two multiplexed fiber optic electromagnetic phenomena sensors, configured to measure multiple electromagnetic phenomena, wherein at least one fiber optic electromagnetic sensor is placed in close proximity to at least one other fiber optic electromagnetic sensor such that one fiber optic electromagnetic sensor is configured to sense a reference signal for comparison to a signal of interest sensed by the other fiber optic sensor to reduce or eliminate noise;
   at least one light source;
   at least one light sensing element for each of the multiplexed fiber optic sensors;
   at least one optical fiber arranged to transmit light from the light source to each of the multiplexed fiber optic sensors;
   at least one optical fiber arranged to transmit light from each fiber optic sensor to its light sensing element, wherein light detected by the light sensing element is converted into an electrical signal; and
   a processor that receives the electrical signal outputs from the light sensing elements and transforms the signals into a reading of the measured phenomena.

25. The system according to claim 24, wherein the at least two fiber optic electromagnetic sensors further comprise at least one of a static or dynamic fiber optic pressure sensor, fiber optic temperature sensor, fiber optic strain sensor, fiber optic displacement sensor, or fiber optic acceleration sensor.

26. The system according to claim 24, wherein the outputs from the fiber optic sensors are used to calculate at least one of power, power factor, real power, apparent power, reactive power, the root-mean-square of voltage and current, or the phase angle between voltage and current or between voltages.

27. The system according to claim 24, wherein the outputs from the fiber optic sensors are used to calculate the source location of a physical phenomena of interest using trilateration, multilateration, or triangulation.

28. The system according to claim 24, wherein each of the fiber optic sensors includes an optical fiber to transmit light from the light source to the fiber optic sensor and at least one optical fiber arranged to transmit light from the fiber optic sensor to a light sensing element.

29. A method of measuring multiple physical phenomena with at least two multiplexed fiber optic sensors, the method comprising:
   transmitting light from a light source through at least one optical fiber to each of the multiplexed fiber optic sensors;
   modulating the intensity of the light based on an physical condition detected by each of the multiplexed fiber optic sensors;
   transmitting the modulated light through at least one optical fiber to at least one light sensing element; and
   measuring one or more physical phenomena based on the output signal from the multiplexed fiber optic sensors, wherein at least one fiber optic sensor is placed in close proximity to at least one other fiber optic sensor, and comparing the output of one fiber optic sensor output signal, used as a reference signal, to the output of the other fiber optic sensor to reduce or eliminate noise, wherein the physical phenomena measured by the sensors include at least one electromagnetic phenomena.

30. The method according to claim 29 wherein the physical phenomena measured by the sensors include at least one measurement of voltage.

31. The method according to claim 29 wherein the physical phenomena measured by the sensors include at least one measurement of current.

32. The method according to claim 29 wherein at least one fiber optic sensor is a current sensor and at least one fiber optic sensor is a voltage sensor.

33. The method according to claim 29, wherein the output signals from the at least two fiber optic sensors are used for calculating at least one of power, power factor, real power, apparent power, reactive power, the root-mean-square of voltage and current, or the phase angle between voltage and current or between voltages.

34. The method according to claim 29, wherein the output signals from the at least two fiber optic sensors are compared for temperature compensation.

35. The method according to claim 29, wherein the sensors are at least one of static or dynamic pressure sensors, strain sensors, electromagnetic phenomena sensors, displacement sensors, acceleration sensors, or temperature sensors.

* * * * *